E. KLEIN.
PROCESS OF MANUFACTURING VEGETABLE OILS.
APPLICATION FILED APR. 10, 1909.
1,161,481.
Patented Nov. 23, 1915.
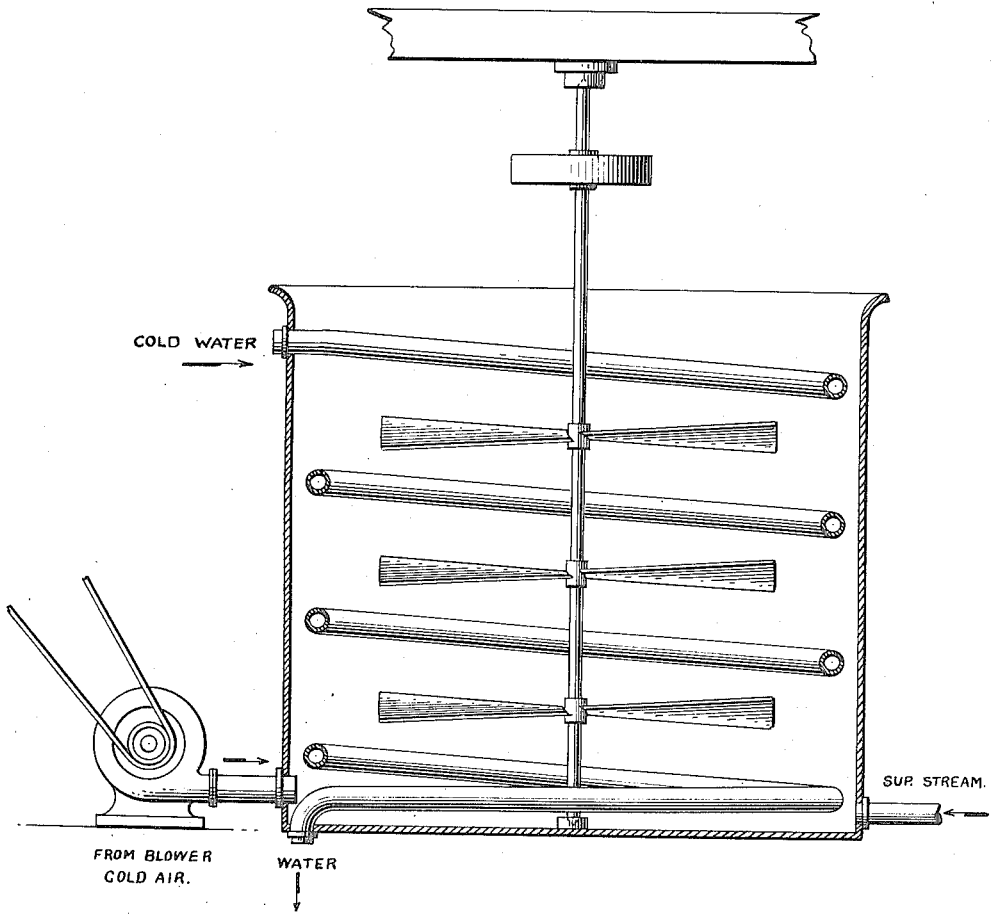

UNITED STATES PATENT OFFICE.

EMANUEL KLEIN, OF NEW YORK, N. Y.

PROCESS OF MANUFACTURING VEGETABLE OILS.

1,161,481.

Specification of Letters Patent.

Patented Nov. 23, 1915.

Application filed April 10, 1909. Serial No. 489,051.

*To all whom it may concern:*

Be it known that I, EMANUEL KLEIN, a citizen of the United States, residing in the borough of Manhattan, city, county, and State of New York, have invented certain new and useful Improvements in Processes of Manufacturing Vegetable Oils, of which the following is a specification.

My invention relates to a new and useful process for the manufacture, purification and deodorization of vegetable fats and oils.

The drawing illustrates an apparatus suitable for carrying out the first step of my improved process.

The invention has for its main object to provide an improved process for the manufacture of a new product from fatty substances, particularly vegetable oil, such as maize oil (*Zea Mays*), or corn oil and oat oil (ovena oil), soy bean oil (*Glycine hispida*) and the like, removing from such oils all substances which may cause them to be disagreable in odor, taste and color, and to render such oils odorless, tasteless, light in color, insoluble in water and of a fixed nature so that they will not turn rancid on exposure to oxygen and light, and of a table oil consistency, whereby said oils as a new product will be adapted for conservation purposes, for baking and other domestic uses, and may be utilized for medical, chemical and industrial purposes.

The varieties soy bean, pea, pulse, are leguminous small erect herbs (*Glycine hispida*) of the bean family of Manchuria, northern China, Japan, India, cultivated in Europe and are becoming to be quite extensively grown in the United States. There is a yellow and a black variety. Aside from a difference in color the two forms apparently do not differ materially from each other. The yellow is known as "wong ton" while the black is known as "hak ton." The seeds vary in color from whitish and yellowish to green, brown and black; and in shape from spherical to elliptical and more or less compressed. They are remarkably high in protein (about 35%) and are highly prized for the quantity of oil or fat (from 17% to 19%) which they contain. The fat has a characteristic leguminous taste. The soy bean oil is made from the seeds (*Glycine hispida*, particularly of the Island of Formosa). The oil, when freshly made is of a yellow-green-brownish color, contains various substances which give it a disagreeable odor, and will turn rancid on exposure to oxygen and light. 100 parts of the oil gave about 27.5 parts dihydroxy-stearic acid, and about ten parts sativic acid. The unsaturated acids in this oil are oleic acid and linolic acid or its isomer.

The kernels of maize or Indian corn, as it is generally known in this country, being richer in albuminoids than any of the other cereals, contains a larger percentage of oil than does other grain, with the exception of oats (ovena oil). In the preparation of meal and starch and fermented and distilled liquors this oil must be removed because it carries a disagreeable, acrid substance, which would be injurious to the flour, starch and liquors prepared from the grain. This oil is an important by-product in distilleries and in glucose and starch factories. In all of these factories the grain is first freed from the oil bearing germ by suitable machinery by which the grain is crushed and the hard, light germ freed so that it may be removed by a process of sifting and winnowing. The separated germs are then steamed to soften them and the oil is then removed by hydraulic pressure. The oil thus obtained is purified only by straining, and contains various substances which give to it a disagreeable odor, rancid taste and dark color, rendering it useless for domestic purposes or for medical use. It is only suitable for use in lubricants and for other purposes wherein the disagreeable odor and taste and dark color are not objectionable. This oil is ordinarily not treated with purifying or bleaching agents, and when freshly made is of a dark straw-yellow brownish color and has a strongly-marked penetrating odor similar to that of newly ground corn meal. The taste of the oil is at first pleasant but is followed by considerable acridity, lingering long on the tongue. This taste is as marked in an oil ten years old as in that freshly made. By my invention I remove from this oil this rancid taste, disagreeable odor and dark color.

The first part of the operation consists in removing from the grain the shell or husk by any suitable means or process and then taking the pared kernels and subjecting them to a grinding operation to remove from the germs the flour material and then separating the hard, light, germs from the flour and the bran and husks by sifting and winnowing or by any other suitable means. It will, of course, be understood that the germs may be separated from the other parts of the grain by any suitable process or by any suitable machine or apparatus.

The germs are placed in a vessel (preferably open) which is provided with suitable heating means and with a cooling means and with a stirring apparatus. If desired the oil may be pressed from the germs, and then placed in this vessel. It will, of course, be understood that the heating means may be any means for securing the desired temperature in the vessel; the cooling means may be a cooling worm or any other suitable device, and the stirring apparatus may be of any suitable form. In some instances I may prefer to use a blast of air for agitating the mass, this blast of air being delivered directly into the mass for the purpose of agitation and for the purpose of creating and carying off moist vapors for a purpose which will appear more fully hereinafter.

In the vessel containing the germs or the oil is placed a substantially equal weight of organic and inorganic material exemplified by brines (saline residue obtained by the evaporation of natural or artificial waters), sea or rock salt containing $NaCl$, $KCl$, $CaCl_2$, $CaSO_4$, $MgSO_4$, $MgCl_2$, bromids, argol, &c., with minute amounts of other salts. The mass is then thoroughly stirred or otherwise agitated and subjected to the chemical action of heat, by any suitable means, for about two hours. I prefer to use superheated steam, delivered directly into the mass for heating purposes. During the delivery of steam into the mass cold water or other cooling means is circulated through the cooling coil and the mass is stirred or otherwise agitated. During this first part of the operation the temperature of about 100 degrees centigrade is maintained about two hours. This temperature may, however, vary from 100 degrees centigrade to about 150 degrees centigrade, without the oil undergoing any chemical change. By circulating the water or other cooling means the steam is condensed and a too rapid heating is prevented and the desired temperature maintained so that burning or scorching is prevented. If the mass is permitted to burn or scorch the result is a discoloration of the oil. By using the cooling means the mass may be maintained at the desired temperature for the desired length of time. By condensing the steam in the mass I obtain the necessary moisture for dissolving the brines, salt, &c., and for softening and disintegrating the germs.

Instead of using brines, etc., as described in the foregoing, I may use the organic and inorganic acids, in which case I use barium carbonate, $BaCO_3$ to remove or neutralize the acids. The mineral acids however are objectionable for the reason that the resultant oil will not be suitable for edible purposes as it is impossible to remove from such oil all traces of said acids by washing or otherwise. Even after very careful manipulation of such oil minute particles of the mineral acid will remain in them and render them unfit for general use and injurious to health if they are used for edible purposes. By using brines, etc., the resultant oil will be pure and will contain nothing which will tend to render it unfit for the uses mentioned herein.

During the first part of the operation the steam or other heating means will heat the mass sufficiently to soften and disintegrate the germs. The cold water will condense the steam, thereby furnishing or producing the solvent for the salt, etc. The dissolved organic and inorganic materials will decompose the substances containing the disagreeable odor of the oil. A portion of these decomposed substances will be absorbed by the said dissolved materials thereby partly freeing the oil from such substances; and a further portion of said separated substances will be carried with the vapor arising from the open vessel containing the menstruum and the germs. If the mass or menstruum in the vessel is not at a sufficiently high temperature to cause steam or vapor to arise therefrom I may force cool air into the mass. This air will be heated by the mass and, arising from the vessel, will carry with it moist vapor and with these vapors and the air will be carried a portion of the decomposed substances, thereby partly freeing the oil from those substances which impart to it the disagreeable odor and rancid taste. It will, of course, be understood that I may use the air even when the mass is at its sufficiently high temperature to cause steam or vapor to arise therefrom.

After the steaming and stirring process has continued for about two hours the heating is discontinued and the agitating operation suspended. The more solid portions of the germs or oil-bearing materials, containing the oil, fat, albumin, clorophyl, and emulsion will settle to the bottom of the vessel; the dissolved brines and salts, whether liquid or semi-liquid will take a position on top of the disintegrated germs which will be on the bottom of the vessel, and if any oil has been liberated during the first part of the operation it will accumulate on top of the dissolved brines and salt, etc.

The second part of the operation consists in removing any oil which may have collected on the top of the mass in the vessel during the first operation; then removing from the vessel the menstruum or dissolved brines, and lastly removing the steamed and disintegrated factors (that is to say, the solid portions of the oil-bearing materials, etc.), containing the fats and oils, etc., from the vessel. The steamed factors are then subjected to hydraulic pressure or by other means to remove therefrom the fats and oils and the other liquid material contained therein. The oil thus secured will be partly purified and will contain only a small part of the substances which impart to the natural oil the disagreeable rancid taste, bad odor and dark color.

I desire it understood that while I prefer to subject the oil-bearing material to the action of heat, a cooling means and to agitation, in the menstruum, the oil might be pressed from the oil-bearing material in any suitable manner and this oil then subjected to heat, a cooling means and to agitation, in the menstruum, and to the other steps in my process.

The third part of the operation consists in cooling the oils and fats received from the press, or other oil-removing means, for the purpose of demargarinating them. The warm oils and fats to be thus further treated are decanted into a suitable vessel, preferably a prepared movable vessel, in order to subject the oil to the chemical action of rapid cooling. Any suitable means may be employed for cooling the oil. I have used artificial or natural ice cut or broken into pieces and placed in the oil to demargarinate it. The ice is quickly melted by the warm fats and oils and certain chemical action takes place and the melted ice dissolves the albumins and absorbs much of the impurities remaining in the oils. The demargarinated oil is then passed through a filter press, at about 0 degrees centigrade, in order to separate the liquid oil from the solids.

The fourth part of the operation consists in deodorizing the oil removed from the filter press. This is accomplished by passing the demargarinated oil through some organic and inorganic filtering material exemplified by marble dust, glass powder, burned deer bones and infusorial earth, in order to subject the oil to the chemical action of these materials when heat is applied as hereinafter set forth. The infusorial earth takes up the emulsion which may be in the oil and thereby clarifies the oil; the marble dust, burned deer bones and glass powder take up the clorophyl which gives to the oil the dark brownish color and thereby lightens the color of the oil; and the glass powder and the burned deer bones absorb whatever there remains in the oil of the substances which gives to the oil its disagreeable odor. The filtering and absorbing materials are used in connection with a suitable constructed asbestos filter. The oil in passing through these materials and filter, is subjected to heat produced by any suitable means, but preferably by the use of superheated steam, at a temperature of about 150 degrees centigrade and above. This heat effects the oil as it is passing through the organic and inorganic filtering materials and said materials act, as above stated, to absorb the impurities and the odor bearing substance. It will be understood that I may use ozone, hydrogen peroxid, sodium peroxid, or calcium peroxid as bleaching, purifying and deodorizing agents, but the use of such materials renders the oil unfit for edible purposes. When the filtering and clarifying materials have become so clogged with the fatty substances, emulsion, dirt and the substances which they absorb, so as to materially interfere with their proper action on the oil and the passage of the oil through them, I remove said filtering and clarifying materials and clean them by placing them in hot water to dissolve the emulsion, fats, albumins, and other foreign matter contained therein. These filtering materials are then dried and may be again used in the filter. These materials may, therefore, be used over and over again. The oil after it has passed through the fourth part of the operation is an edible table oil product of an agreeable odor and taste, of a table oil-like consistency, light greenish in color, insoluble in water and alcohol, and will not turn rancid on exposure to oxygen and light Fixed oils are not capable of being distilled without decomposition. When heated alone they darken and evolve acrid offensive vapors and when further heated to about 315° C. (600 F.) carbon dioxid is evolved together with peculiarily irritating vapors of acrolein, $C_3H_4O$, and various volatile organic acids and gaseous, liquid, and solid hydro-carbons. They suffer a similar decomposition by acting on them with sulfuric acid or a strong alkali base. The non-drying oils, when absolutely free from foreign matter most of them remain unchanged, but commercial specimens gradually turn rancid, that is, lose their fluidity to a certain extent, and acquire a rancid disagreeable taste. Oils of vegetable origin, even in their fresh state, mostly contain appreciable quantities of free fatty acids. This may be due to the fact that in the seeds there are contained enzyms which hydrolyze glycerids, carbonic acid, which is always present, supplying the acid necessary for hydrolysis. When sufficient water is present, the hydrolysis will progress somewhat rapidly. This alteration is due to the presence of foreign matters from the cellular substance of the plant from which the oil was extracted. These bodies furnish nourishment for microbes which set free fatty acids, besides producing small quantities of volatile acids of strong odor. On exposure to the atmosphere oils and fats gradually undergo certain changes. The action of light alone, has hitherto not been studied thoroughly. In considering the effect of air we must clearly discriminate between the influence of the ordinary atmosphere, which necessarily includes the action of oxygen, moisture and light (diffused daylight, direct sunlight) and the influence of dry air, to the exclusion of moisture and light. By my process the bacteria is killed and removed and the foreign matters which furnish nourishment for the microbes are also removed, so that the oil will maintain its normal condition without change upon hydrolysis to the accelerating action of enzyms, therefore, the oil cannot become rancid.

If desired the oil may be washed with alcohol to remove any remaining traces of the dark greenish color-bearing substances and any of the substances bearing the disagreeable rancid taste should any of such substances be present in the purified oil. I have found it unnecessary to use alcohol for this purpose as the oil is in most cases free from such substances after the fourth part of the operation. It will be understood that after the washing operation the oil will be on top of the alcohol and may be readily removed therefrom. The alcohol may, of course, be re-distilled and used over and over again.

While I have described my process as especially adapted to recovering oil from germs it is to be understood that I may use it for the recovery of oils from seeds and similar oil-bearing materials. I use the term "demargarinization" or "demargarinating" or "demargarinated" to convey a clear mental picture of the removal of the major part of the margarin from a fixed oil by the process of chilling the oil and filtering or expressing.

I wish it understood that I do not wish to be limited to the precise steps in the process described herein, or to the exact ingredients and proportions herein set forth as changes may be made therein without departing from the scope of my invention.

Having thus described my invention, what I claim as new and desire to secure by Letters Patent, is:—

1. The process of treating germs, seeds, etc., for the recovery of vegetable oils, consisting in subjecting the germs or other oil-bearing materials to the chemical action of heat and a cooling medium in the presence of a menstruum composed of organic and inorganic materials, eliminating the menstruum, and subjecting the oil-bearing material to pressure to recover the oil.

2. The process of treating germs, seeds, soy beans, etc., for the recovery of vegetable oils consisting in subjecting the oil-bearing material to disintegration in the presence of heat, a cooling medium and agitation with suitable substances, then separating the oil-bearing material from the said substances and then recovering the oil.

3. The process of treating germs, seeds, etc., for the recovery of vegetable oil which consists in subjecting the germs, etc., to heat and agitation, and an indirect cooling medium in a suitable menstruum composed of organic and inorganic materials and then recovering the oil from the oil-bearing material.

4. The process of treating germs, seeds, soy beans, pulse, etc., for the recovery of vegetable oils and for the removal from the oil of certain deleterious substances consisting in subjecting the germs, etc., to the chemical action of heat and a cooling medium in the presence of a menstruum composed of organic and inorganic materials to liberate and absorb the deleterious substances, then eliminating the menstruum, and then subjecting the oil-bearing material to pressure to recover the oil.

5. The process of treating germs, seeds, soy beans, pulse, etc., for the recovery of oil, consisting in subjecting the germs, etc., to the chemical action of heat at 100 to 150 degrees centigrade in the presence of a cooling medium and to the chemical action of a menstruum composed of substantially equal weight of organic and inorganic acids, then eliminating the menstruum, and then recovering the oil from the oil-bearing material.

6. The process of manufacturing vegetable oils consisting in subjecting the germs, soy beans, pulse, or other oil-bearing vegetable materials to the chemical action of a menstruum composed of mineral acids, mixing the mass and agitating it, heating it to 100 degrees centigrade or over in the presence of a cooling medium, permitting the oil-bearing material to separate from the menstruum, eliminating the menstruum, subjecting the oil-bearing material to pressure to recover the oil, subjecting the warm oil to the chemical action of suitable means for demargarination, passing the demargarinated oil through and subjecting it to the chemical action of organic and inorganic filtering materials in the presence of heat.

7. The process of treating germs, seeds, etc., for the recovery of oil, consisting in subjecting the oil-bearing material to the action of a menstruum in the presence of heat and an indirect cooling medium, eliminating the menstruum, recovering the oil, demargarinating the oil, and then passing the demarginated oil through organic and inorganic material in the presence of heat.

8. The process of treating germs, seeds, etc., for the recovery of oil consisting in subjecting the oil-bearing material to the action of a menstruum in the presence of heat and in the presence of a cooling medium, eliminating the menstruum, recovering the oil from the oil-bearing material, demargarinating the oil, and then passing the demargarinated oil through some filtering material to filter the oil and absorb the coloring matter and odor-bearing substances.

9. The process of treating germs, seeds, etc., for the recovery of oil consisting in subjecting the oil-bearing material to the action of a menstruum in the presence of heat and a cooling medium, eliminating the menstruum, recovering the oil from the oil-bearing material, demargarinating the oil and then passing the demargarinated oil through marble dust, glass powder, burned deer bones and infusorial earth in the presence of heat.

10. The process of treating germs, seeds, etc., for the recovery of oil consisting in subjecting the germs, seeds, etc., to the action of a menstruum, thoroughly agitating the mass and subjecting it to heat at about 100 degrees centigrade for about two hours in the presence of an indirect cooling medium, then permitting the oil-bearing material to settle by gravity from the menstruum, then eliminating the menstruum and recovering the oil from the oil-bearing material by pressure, cooling the oil, subjecting the demargarinated oil to filter and deodorize it with an inorganic and organic material in the presence of heat.

11. The process of recovering vegetable oils consisting in placing the germs or seeds, etc., in a vessel together with an equal weight of menstruum composed of organic and inorganic materials, subjecting the germs, etc., and menstruum to a suitable temperature and to agitation in the presence of an indirect cooling medium, whereby the deleterious matter carried by the germs will be liberated and partly vaporized and partly decomposed by the menstruum, removing the vegetable mass from the menstruum, pressing the oil from said mass, then cooling said oil to demargarinization and forcing the same through a filter press at about 0 degrees centigrade, and passing said oil through suitable filtering and absorbing means in the presence of heat.

12. The process of treating germs, seeds, etc., for the recovery of vegetable oil consisting in disintegrating the germs, etc., in a suitable menstruum in the presence of heat and a cooling medium, then separating the oil-bearing material from the menstruum, then recovering the oil from the mass.

13. The process of treating oil-bearing vegetable matter consisting in subjecting said matter to the action of superheated steam applied directly thereto and to a cooling means in a suitable menstruum, agitating the mass, separating the oil-bearing material from the menstruum and then recovering the oil from said material.

14. The process of treating germs, seeds, etc., for the recovery of vegetable oils consisting in subjecting the oil-bearing material to heat and to the action of a cooling medium to disintegrate the germs and then recovering the oil from the oil-bearing material.

15. The process of recovering oil from germs, grains and other vegetable matter consisting in subjecting the oil-bearing material to the action of superheated steam applied directly thereto in an open vessel and to the action of a cooling medium applied indirectly thereto, agitating the material to soften and disintegrate it and then recovering the oil.

16. The process of treating germs, seeds or other vegetable matter for the recovery of oil consisting in subjecting the germs, etc., to the action of a menstruum, thoroughly agitating the mass and subjecting it to superheated steam applied directly thereto and to the action of a cooling medium applied indirectly thereto to maintain a suitable temperature for about two hours, then separating the oil-bearing material from the menstruum, recovering the oil from the oil-bearing material by pressure.

17. The process of recovering oil from vegetable matter consisting in subjecting the crude oil or oil-bearing material to the action of a menstruum, in the presence of heat and a cooling medium and thoroughly agitating the mass, then separating the oil or the oil-bearing material from the menstruum and finally purifying the oil.

18. The process of treating germs, seeds, etc., for the recovery of oil consisting in subjecting said germs, seeds, etc., to the action of a menstruum in the presence of heat and an indirect cooling medium, eliminating the menstruum, recovering the oil from the oil-bearing material, demargarinating the oil, filtering the demargarinated oil through organic and inorganic materials in the presence of heat, and washing it with alcohol.

19. The process of treating germs, etc., for the recovery of oil, consisting in subjecting the oil-bearing germs, etc., to the action of a menstruum in the presence of heat and a cooling medium, eliminating the menstruum, pressing the oil from the oil-bearing material, demargarinating the oil, filtering the demargarinated oil through organic and inorganic materials in the presence of heat, deodorizing and bleaching agents.

20. The process of manufacturing vegetable oils, consisting in subjecting the crude vegetable oil or the oil bearing vegetable material to the action of a menstruum composed of brines, sea or rock salt, organic and inorganic acids in the presence of heat, and an indirect cooling medium, and a blast of cool air, eliminating the menstruum, pressing the oil from the oil bearing material, demargarinating the oil, filtering the demargarinated oil under pressure at a temperature of 0 degrees centigrade, passing the demargarinated oil through organic and inorganic filtering materials in the presence of heat, subjecting it to deodorizing and bleaching agents, and washing it with alcohol.

21. The process of manufacturing vegetable oils consisting in subjecting germs or other oil-bearing vegetable materials to the chemical action of a menstruum composed of organic acids, heating the mass, permitting the oil-bearing materials to separate from the menstruum, eliminating the menstruum, subjecting the oil-bearing material to pressure to recover the oil, subjecting the warm oil to the chemical action of suitable means for demargarination, passing the demargarinated oil through and subjecting it to the chemical action of organic and inorganic filtering materials in the presence of heat.

22. The process of manufacturing vegetable oils consisting in subjecting the germs, soy beans, pulse, or other oil-bearing vegetable materials to the chemical action of a menstruum composed of organic acids, mixing the mass and agitating it, heating it to 100 degrees centigrade or over in the presence of a cooling medium, permitting the oil-bearing material to separate from the menstruum, eliminating the menstruum, subjecting the oil-bearing material to pressure to recover the oil, subjecting the warm oil to the chemical action of suitable means for demargarination, passing the demargarinated oil through and subjecting it to the chemical action of organic and inorganic filtering materials in the presence of heat.

23. The process of manufacturing vegetable oils consisting in subjecting the crude vegetable oil or the oil-bearing vegetable material to the action of a menstruum composed of brines, sea or rock salt, organic and inorganic acids in the presence of heat, eliminating the menstruum, pressing the oil from the oil-bearing material, demargarinating the oil, filtering the demargarinated oil under pressure at a temperature of 0 degrees centigrade, passing the demargarinated oil through organic and inorganic materials in the presence of heat.

In testimony whereof I hereunto affix my signature in the presence of two witnesses this 8th day of April 1909.

EMANUEL KLEIN.

Witnesses:
  WM. R. DAVIS,
  E. H. KAUFMANN.